Aug. 18, 1942.    G. P. HALFERTY    2,293,133
CLAM SPLITTER
Filed March 2, 1940    2 Sheets-Sheet 1
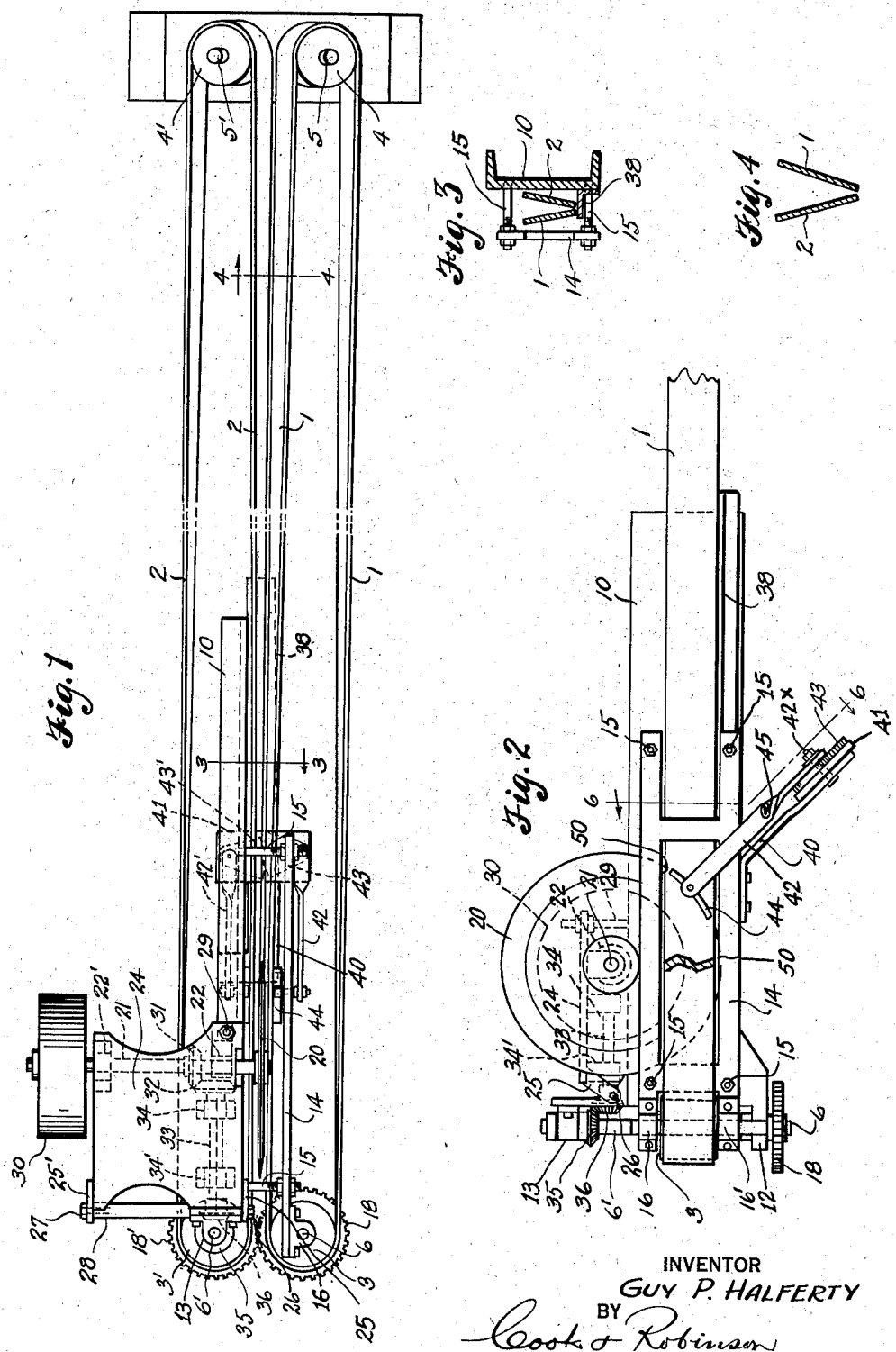
INVENTOR
GUY P. HALFERTY
BY
Cook & Robinson
ATTORNEYS Aug. 18, 1942.　　G. P. HALFERTY　　2,293,133
CLAM SPLITTER
Filed March 2, 1940　　2 Sheets-Sheet 2
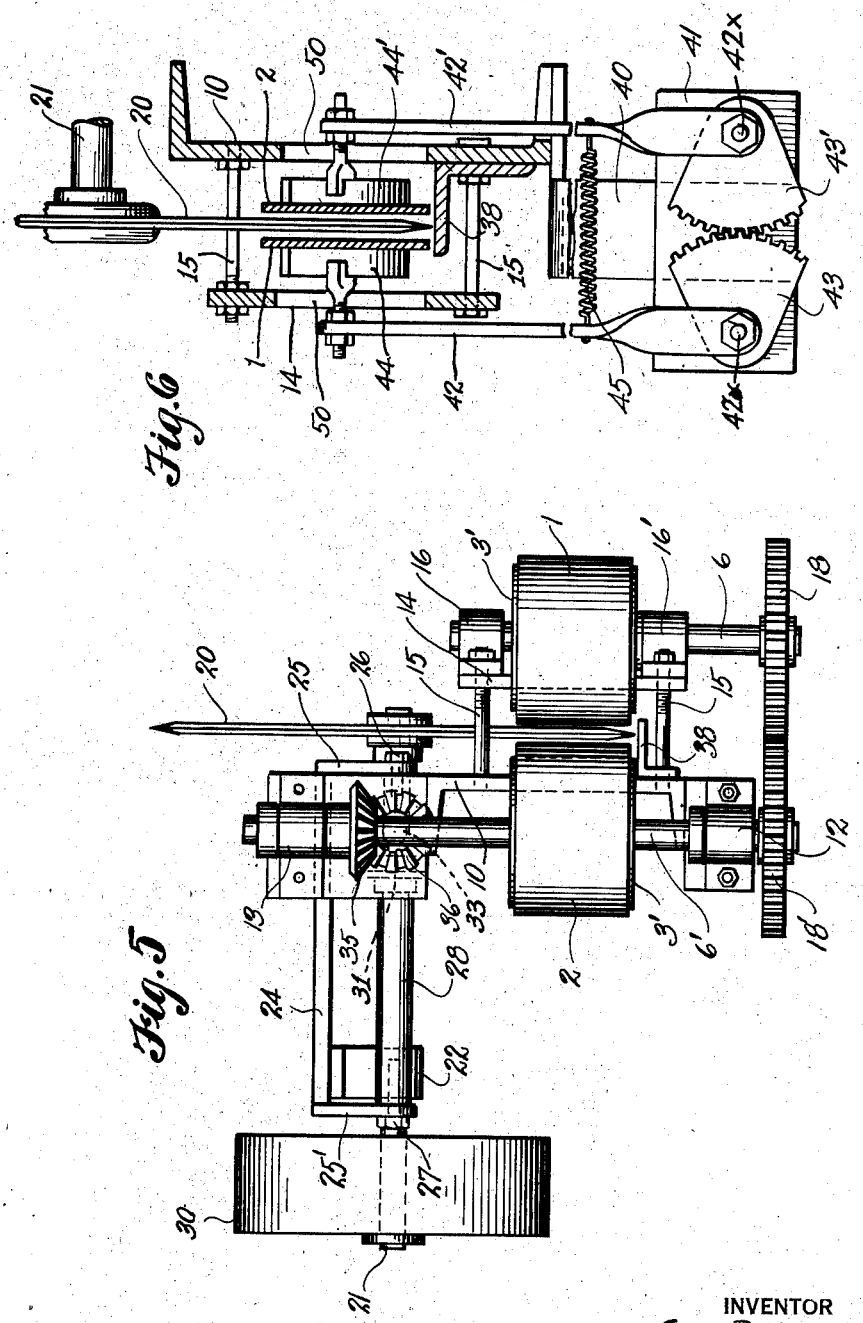
INVENTOR
GUY P. HALFERTY
BY
Cook & Robinson
ATTORNEYS Patented Aug. 18, 1942

2,293,133

UNITED STATES PATENT OFFICE 2,293,133

CLAM SPLITTER

Guy P. Halferty, Seattle, Wash.

Application March 2, 1940, Serial No. 321,874

5 Claims. (Cl. 17—2)

This invention relates to devices known as clam splitting machines, and has for its principal object to provide a fully automatic machine, or mechanism, whereby clams and the like, after being removed from their shells, may be split or cut in halves to facilitate cleaning and for canning purposes.

More specifically stated, the object of the present invention is to provide an improved type of machine whereby the clams, upon removal from their shells, may be cut lengthwise in halves such as would be the case if split while in the shell by passing a knife therethrough between the edges of the two half shells.

It is also an object of this invention to provide an automatic machine for the above stated purpose, embodying two traveling belts between which the claims are supported and conveyed to a revolubly driven knife of disk-like form, and wherein means is provided to coact with the belts for automatically centering each clam with reference to the splitting knife so that each will be divided in equal parts, regardless of any variation that may exist in the thickness of clams which are successively brought to the knife by the conveyor belts.

Other objects of the invention reside in the combination of parts used in the specific means, or devices which operate in conjunction with the traveling belts for centering the clams relative to the splitting knife.

Still further objects reside in the disposition and relationship of belts that form the conveyor trough, and in the details of construction and combination of operating parts and in their mode of operation, as will hereinafter be fully described.

In accomplishing these and other objects of the invention, I have provided the improved details of construction, the preferred forms of which are illustrated in the accompanying drawings, wherein—

Fig. 1 is a top, or plan view of a clam splitting machine embodied by the present invention.

Fig. 2 is a side view of the discharge end of the machine, showing the clam centering and splitting means.

Fig. 3 is an enlarged cross sectional view on line 3—3 in Fig. 1.

Fig. 4 is an enlarged cross sectional view taken on the line 4—4 in Fig. 1, showing the relationship of belts to form the conveyor trough in which the clams are conveyed to the splitting knife.

Fig. 5 is an end view of the machine, particularly illustrating the belt and knife driving mechanism.

Fig. 6 is an enlarged cross sectional detail taken on the line 6—6 in Fig. 2, showing the clam centering levers.

Briefly described, the present machine comprises two endless belts, disposed side by side and having the two adjacent runs thereof traveling in the same direction at the same speed and so supported along one end of the machine that together they provide a V-shaped trough into which the clams may be disposed for conveyance to the splitting knife; it being understood that each belt forms the side of the trough, and they are sufficiently close together that the clams, when placed therein, will be held flatwise.

Supported centrally between the trough forming portions of the belts, at what may be designated as the discharge end of the machine, is a revolubly driven, disk-like cutter or knife against which the clams will be conveyed by the belts and whereby they will be split in halves. Bearing against the outside surfaces of the two runs of the belts which form the trough at points substantially even with that part of the knife disk that first contacts the clams, as advanced by the belts, are the ends of a pair of pivotally mounted lever arms. These arms operate to yieldingly urge the runs of the belts close to opposite sides of the knife disk, and are adapted to move inwardly, or outwardly with the belt in accordance with the passage of the clams past the knife. These levers have their mounting ends connected through the mediacy of intermeshing gear segments in such manner that any outward or inward deflection of either belt that might be due to the passing of a clam against the knife, will be transmitted to the contacting lever arm and the opposite lever, and will be moved accordingly, thus insuring that all clams, regardless of thickness, will be centered relative to the knife edge and split in parts of equal thickness.

Referring more in detail to the drawings—

1 and 2, respectively, designate endless belts, preferably of equal lengths and widths, and mounted for travel about a pair of belt pulley wheels 3 and 3', at one end of the machine, and a pair of belt pulleys 4 and 4' at the other end. The pulleys 4 and 4' are at what may be called the receiving end of the machine, and are mounted, respectively, on supporting shafts 5 and 5' that diverge slightly, and are so spaced that the two adjacent runs of the belts, as noted in Fig. 4, together form a V-shaped trough; each belt forming one side wall of the trough. The pulleys 3 and 3' are mounted by vertical, parallel shafts 6 and 6' through the mediacy of which the belts are driven in unison, and the latter pulleys are so spaced as to bring the two trough forming runs of the belt substantially to vertical position and quite close together at this end of the machine.

At the discharge end of the machine is a frame structure for mounting the knife, its driving gears and the belt adjusting levers. This comprises a channel iron beam 10, disposed horizontally and lengthwise of the belts and close to the outside of that run of the belt 2 which forms a side of the trough. The channel member 10 is disposed facing outwardly with respect to the knife, as noted in Fig. 1, and at one end it has bearings 12 and 13 fixed thereto in spaced relationship and in which the vertical pulley shaft 6' is revolubly mounted; the pulley 3' being fixed on this shaft between the bearings. Supported from the beam 10 and extending lengthwise thereof is a rectangular frame structure 14 which, as noted by reference to Figs. 1, 2 and 3, is fixedly mounted by four bolts 15 that are fixed in, and extend laterally from, the beam 10. The frame 14 is located at the outside of that run of the belt 1 that forms a side of the trough and opposite the beam 10, and at one end it is equipped with vertically spaced bearings 16 and 16' in which the vertical shaft 6 is revolubly mounted; the pulley 3 being mounted on this shaft between the said bearings.

In order that the belts 1 and 2 will travel at the same speed, the pulleys 3 and 3', which are driven, are of the same diameter, and the two shafts 6 and 6', which mount them, are equipped at their lower ends with intermeshing gear wheels 18 and 18' of the same diameter. This causes the two trough forming runs of the belts to travel in the same direction and at the same speed.

The clam splitting knife is designated by reference numeral 20 and it comprises a circular disk of substantial diameter, with sharpened peripheral edge and mounted on a driven axis or shaft 21.

The knife disk 20 is supported in a vertical plane medial of the two runs of belts forming the trough where they pass to the pulleys 3 and 3' between the beam 10 and frame 14, and in such position that the clams conveyed between the belts will be split thereby. The shaft 21 is supported revolubly in bearings 22 and 22' fixed to the under side of a flat horizontally disposed supporting plate 24 that is supported from the beam 10.

As shown best in Figs. 1 and 5, the plate 24 has downwardly directed ears, or brackets 25—25' at opposite sides of one edge, through which attaching bolts 26 and 27 are extended to fix the plate to the supporting beam 10 and to a shaft 28 that is fixed rigidly to and extends laterally from the beam. At the inner corner of its opposite edge, the plate 24 has a vertical bolt 29 fixed therein to adjustably support this edge of the plate above the beam 10; it being understood that the disk knife may be lifted from between the belts for cleaning by swinging the free edge of the plate 24 upwardly. However, when the blade is swung back to working position, with the knife between the belts, it will be supported at proper position by the bolt 29 engaging with the top flange of beam 10.

The shaft 21 extends beyond the outer edge of the plate 24 and is there equipped with a belt pulley 30 whereby it may be driven to drive the knife.

Fixed on the shaft 21, between its supporting bearings, is a bevel gear wheel 31 in driving mesh with a bevel gear wheel 32 that is keyed on one end of a shaft 33 revolubly mounted in bearings 34—34' on the under side of the plate 24. The shaft 33 has geared connection at its other end with the upper end of the pulley driving shaft 6'; the connection being effected by means of bevel gear wheels 35 and 36 that are fixed respectively on the shafts 6' and 33.

To prevent possibility of the clams slipping down between the belts, an angle bar 38 is fixed to beam 10 with its horizontal flange extending beneath the lower edges of the belts, as noted in Figs. 2 and 3.

It is anticipated that the belts 1 and 2 shall be of considerable length, so that there will be room for several workmen to stand along the trough forming portion at the receiving end of the machine.

In use of the machine, the workers inspect the clams and shove them from the inspection belts, not shown, into the trough formed by the two belts, and the clams are thereby conveyed to the splitting knife. The clams naturally assume a flatwise position between the belts; that is, with their flat sides against the belts.

It is desirable that all clams be evenly split; that is, divided into two equal parts so that they may be more expeditiously cleaned, and in order that there will be pieces of even size for canning.

In order to insure that each clam, regardless of its thickness, will be evenly split by the knife, I have provided the centering means which is illustrated best in Fig. 6, for insuring this result. This centering means may be described as follows: Fixed to the under side of the beam 10 is a bracket 40 which supports an angularly disposed plate 41, located directly beneath the trough forming portion of the belts and slightly ahead of the knife. Pivotally supported by this plate by pivot bolts 42x, and extending upwardly therefrom, respectively, to opposite sides of the trough, are lever arms 42 and 42'. At their mounting ends, the levers are equipped, respectively, with gear segments 43 and 43', which are in operative mesh with each other. At their free ends, the levers carry runners 44 and 44' which bear respectively against the outside surfaces of the two runs of the trough forming belts substantially even with the cutting edge of the disk where it first contacts with the clams. A spring 45 joins the two levers under tension so that they will be urged against the belts and will yieldingly hold the belts quite close to opposite sides of the knife disk. Thus, when a clam is brought between the two belts to the knife edge, it is held centered by the belts relative to the knife and, should the clam be of such thickness as to spread the belts apart, the intermeshing gear segments will cause an equal outward movement of both levers and thus insure that the belts will hold the clams centered relative to the knife edge. Thus, in accordance with change in thickness of the clams successively brought to the knife, the belts will be moved inwardly or outwardly to equal extent and an equal division of each clam will be insured.

In order that the runner or contact members may engage the belts without interference by the frame members, the frame beam 10, and the frame 14 each have openings or cut away portions, as designated at 50, through which the belt is exposed to the contact members.

Machines of this character may be made in various lengths, according to the needs or capacity desired, and they may be made to accommodate clams, oysters or fish, and it is apparent and should be understood that details of construction of parts both for supporting and driving the belts, and knife, might be changed to suit conditions, and without departing from the spirit of the invention.

Having thus described my invention, what I claim as new therein and desire to secure by Letters Patent is:

1. A machine of the character described comprising a pair of endless belts, means supporting said belts with runs thereof in positions serving as the opposite side walls of a conveyor trough, means for driving the belts to cause longitudinal travel of the trough walls in the same direction, a disk knife supported in the trough between the walls thereof and operable for the division of objects conveyed thereto by the travel of the belts, and coacting devices bearing inwardly against the belts at opposite sides of the trough and at points adjacent the location of the knife to normally retain the belts close to and equally spaced from the opposite sides of the knife, and permitting outward yielding of the belts relative to the knife to the same extent in the support of an object between them and for centering the object relative to the knife.

2. A machine of the character described comprising a pair of endless, flexible belts, means supporting said belts with runs thereof in positions, respectively, forming opposite side walls of a conveyor trough, means for driving the belts to cause travel of the walls of the trough lengthwise at the same speed and in the same direction, a disk knife mounted in the trough and operable for the division of objects conveyed thereto by the travel of the belts, a pair of pivotally mounted lever arms located, respectively, at opposite sides of the knife, shoes mounted by the lever arms to engage the corresponding belts, means yieldingly acting on the lever arms to cause them normally to retain the belts relatively close to the opposite sides of the knife, and means interconnecting the levers whereby the spacing of the belts from the opposite sides of the knife is maintained equalized in the passing of objects of varying thickness to the knife.

3. A machine of the character described comprising a pair of endless, flexible belts, means supporting said belts with runs thereof forming the opposite side walls of an elongated conveyor trough, means for driving the belts to cause the trough walls to travel in the same direction and at the same speed, a disk knife supported in the central longitudinal plane of the trough near one end thereof, and operable for the division of objects conveyed thereto by the trough in its travel, a pair of pivotally mounted levers, runners at the swinging ends of the levers, respectively, bearing inwardly in contact with the two belts adjacent the knife, a spring under tension connecting the levers, and intermeshing gear segments fixed on the levers at their pivoted ends and maintaining equality of spacing of the belts from the opposite sides of the knife disk.

4. In a machine of the character described, a pair of endless, flexible belts, means for supporting the belts with adjacent runs thereof respectively forming opposite sides of a conveyor trough, a disk knife operatively supported in the trough for the division of objects that may be conveyed thereto by the trough and means for driving the belts to cause the trough forming walls to move toward the knife; said belt supports being arranged to cause the belts to form a V-shaped trough leading up to the knife, then to be deflected substantially into parallel relationship and close to opposite sides of the knife to hold objects between them for division by the knife.

5. In a machine of the character described, a longitudinally moving conveyor having flexible side walls forming a V-shaped trough, a knife disposed in the trough for halving objects brought thereto by the trough in its movement, and means for causing the trough walls to be flexed into parallel relationship as they approach the knife and to coact for the holding of an object between them for halving by the knife.

GUY P. HALFERTY.